US008018838B2

(12) United States Patent
Zettinger et al.

(10) Patent No.: US 8,018,838 B2
(45) Date of Patent: Sep. 13, 2011

(54) APPARATUS AND METHOD FOR PROTECTION SWITCHING IN A NETWORK

(75) Inventors: Chris R. Zettinger, Wheaton, IL (US); Mark E. Boduch, Geneva, IL (US); Robert R. Ward, St. Charles, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1283 days.

(21) Appl. No.: 10/606,948

(22) Filed: Jun. 25, 2003

(65) Prior Publication Data

US 2004/0085895 A1 May 6, 2004

Related U.S. Application Data

(60) Provisional application No. 60/391,318, filed on Jun. 25, 2002.

(51) Int. Cl.
*H04L 1/00* (2006.01)

(52) U.S. Cl. ........................................ 370/219; 370/220

(58) Field of Classification Search .......... 370/217–224, 370/388, 400, 244, 250; 714/3, 6, 11, 13, 714/41; 398/1–8; 340/3.43, 3.44, 825.01; 379/4

See application file for complete search history.

(56) References Cited

U.S. PATENT DOCUMENTS

| | | | | |
|---|---|---|---|---|
| 4,817,094 A * | 3/1989 | Lebizay et al. | ............... | 714/797 |
| 5,216,666 A * | 6/1993 | Stalick | ............. | 370/222 |
| 5,303,078 A * | 4/1994 | Brackett et al. | ................. | 398/51 |
| 5,321,813 A * | 6/1994 | McMillen et al. | ............. | 714/798 |
| 5,327,275 A * | 7/1994 | Yamane et al. | ..................... | 398/2 |
| 5,365,510 A * | 11/1994 | Nicholson et al. | ............ | 370/222 |
| 5,404,352 A * | 4/1995 | Pauwels et al. | ............... | 370/390 |
| 5,771,225 A * | 6/1998 | Iino | ............... | 370/217 |
| 5,878,025 A * | 3/1999 | Tomonaga et al. | ............ | 370/219 |
| 5,920,412 A * | 7/1999 | Chang | ............. | 398/83 |
| 6,115,155 A * | 9/2000 | Liu et al. | ........................... | 398/5 |
| 6,201,788 B1 * | 3/2001 | Ishiwatari | .................... | 370/228 |
| 6,332,198 B1 * | 12/2001 | Simons et al. | .................... | 714/6 |
| 6,456,587 B2 * | 9/2002 | Taniguchi | ..................... | 370/216 |
| 6,498,792 B1 | 12/2002 | Johnson et al. | | |
| 2003/0043810 A1 | 3/2003 | Boduch et al. | | |
| 2004/0213205 A1 * | 10/2004 | Li et al. | ........................ | 370/352 |

OTHER PUBLICATIONS

GR-253-Core, Synchronous Optical Network (SONET) Transport Systems: Common Generic Criteria, Sep. 2000, Telcordia Technologies, Issue 3. portions of section 5.*
Goralski, Walter, SONET, Jul. 10, 1997, McGraw-Hill, Table i.3.*
SONET Networking Topologies, Appendices A-G, pp. 99-137, Nortel, Northern Telecom, 56015.16/10-96 Issue 3, 1996.

\* cited by examiner

*Primary Examiner* — Thai D Hoang
(74) *Attorney, Agent, or Firm* — Hamilton, Brook, Smith & Reynolds, P.C.

(57) ABSTRACT

A system supports 50 ms protection switching times independent of network architecture. The system includes multiple protection switch fabrics to perform facility protection switching for the signals and a central switch fabric to switch a subset of the signals in a non-facility protection switching manner among the protection switch fabrics. Linear and ring network configurations are supported by the system. The system has flexibility to perform Linear Automatic Protection Switching (LAPS), Unidirection Path Switched Ring (UPSR) protection switching, and Bidirectional Line Switched Ring (BLSR) protection switching without burdening the central switch fabric with unnecessary or redundant traffic.

23 Claims, 16 Drawing Sheets

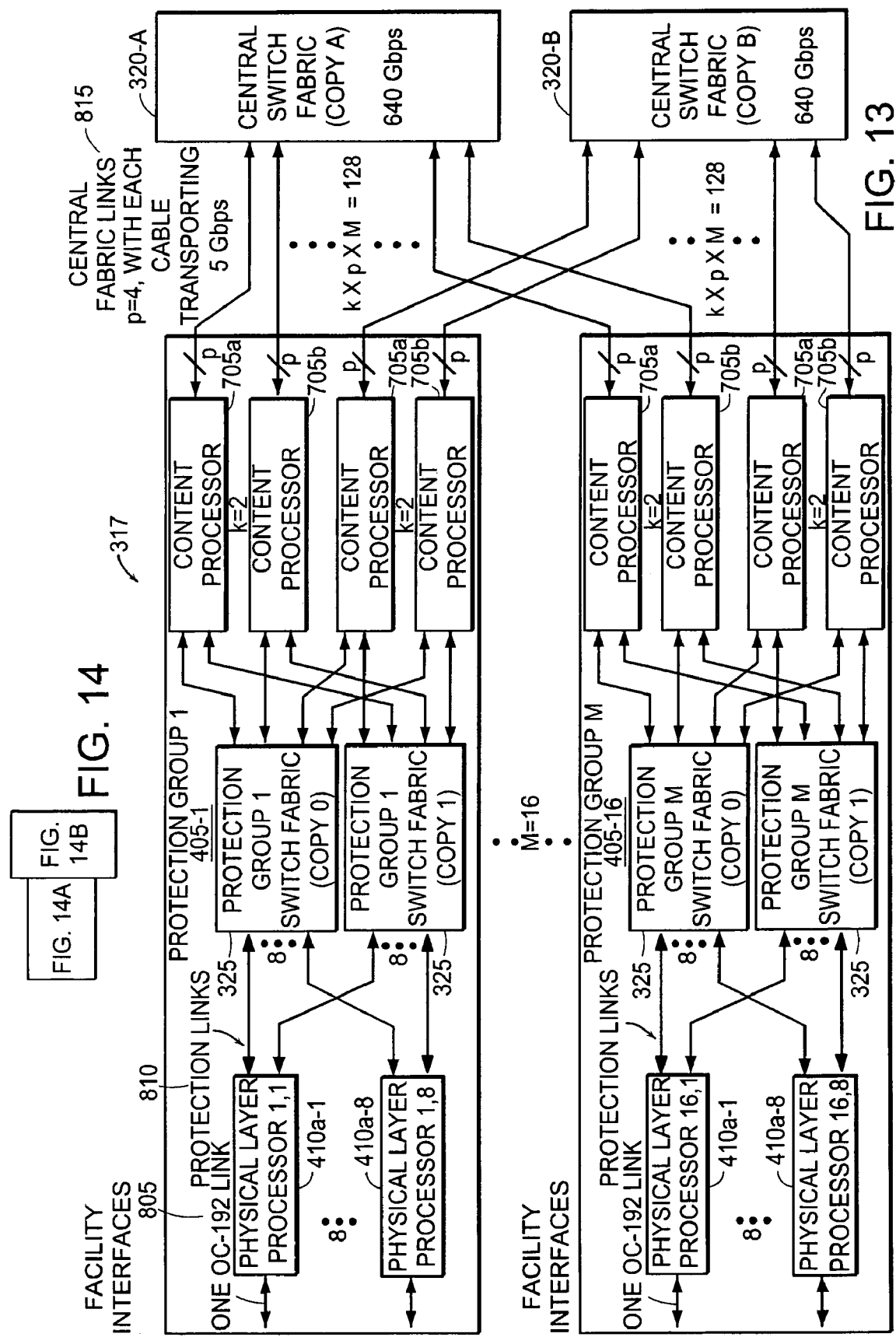

APPARATUS AND METHOD FOR PROTECTION SWITCHING IN A NETWORK

RELATED APPLICATIONS

This application claims the benefit of U.S. Provisional Application No. 60/391,318, filed Jun. 25, 2002; the entire teachings which are incorporated herein by reference.

BACKGROUND OF THE INVENTION

The requirements for transport network resilience are quite stringent. They include 99.999% availability, two hour repair windows, and 50 millisecond (ms) protection switching times. The 50 ms protection switching time is actually one portion of the generally understood maximum 60 ms interruption, where up to 10 ms are allocated to fault detection and 50 ms are allocated to performing the protection switch. The remainder of this discussion refers only to the 50 ms portion.

The 50 ms requirement dates back to the early days of computer networks and is now an expected attribute of transport equipment. While this requirement originally applied to redundancy switching in equipment, such as stand-alone M13 multiplexers that takes 28 DS1 inputs and combines them into a single 44.736 Mbps DS3 stream, it is now the basis for several industry equipment specifications, including GR-499-CORE (GR-499-CORE, Telcordia "Transport System Generic Requirements (TSGR): Common Requirements," Issue 2, December 1998), and various SONET network protection schemes, including ANSI T105.01 (ANSI T1.105.02, Alliance for Telecommunications Industry Solutions, "Synchronous Optical Network (SONET)-Automatic Protection," 2000), Telcordia GR-253-CORE (GR-253-CORE, Telcordia, "Synchronous Optical Network (SONET) Transport Systems: Common Generic Criteria," Issue No. 3, September 2000), GR-1230-CORE (GR-1230-CORE, Telcordia, "SONET Bidirectional Line Switched Ring Equipment Generic Criteria," Issue No. 4, December 1998), and GR-1400-CORE (GR-1400-CORE, Telcordia, "SONET Dual-Fed Unidirectional Path Switched Ring (UPSR) Equipment Generic Criteria," Issue No. 2, January 1999).

The drivers that led to such a stringent requirement generally include the signal timing of analog trunks, timeouts of automatic teller machines, Systems Network Architecture (SNA) links, and Signaling System No. 7 (SS7) links. Regardless, the 50 ms protection switching is an expected part of today's transport network. In fact, it is often a criteria of transport network service level agreements and is often included in published tariffs of local exchange carriers.

There has been some discussion about relaxing this requirement, particularly as less sensitive data services proliferate. Higher layer data services typically provide network resiliency with a longer time frame on the order of seconds for the recovery of traffic. This is at least partially based on the premise that the transport network will provide consistent and fast 50 ms protection switching times. If the protection switch times of the transport network were to lengthen and become less consistent, an additional protection time frame would be introduced into the network. These additional protection times add layers of complexity that the carriers would need to manage, while sharing many of the same transport resources. An overlay approach could be considered, but it brings with it a whole host of business, operational, and technical issues. Given that many end-user services rely explicitly or implicitly on this requirement, the 50 ms protection switch time is here to stay.

SUMMARY OF THE INVENTION

To achieve 50 ms protection switching times independent of network architecture, a system or distributed set of network nodes employing a distributed switch fabric architecture may be employed according to the principles of the present invention. The system includes multiple protection switch fabrics to perform facility protection switching on the signals. The system also includes a central switch fabric connected to the protection switch fabrics. The central switch fabric is used to switch a subset of the signals in a non-facility protection switching manner among the protection switch fabrics.

The system has flexibility to perform Linear Automatic Protection Switching (LAPS), Unidirectional Path Switched Ring (UPSR) protection switching, and Bidirectional Line Switched Ring (BLSR) protection switching. The system also supports extra traffic, drops/continue, and bridge/substitute operations without burdening the central switch fabric with unnecessary or redundant traffic.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention

FIGS. 8-14 are schematic diagrams illustrating various example configurations of the system of FIG. 4.

DETAILED DESCRIPTION OF THE INVENTION

A description of preferred embodiments of the invention follows.

Figure 1:
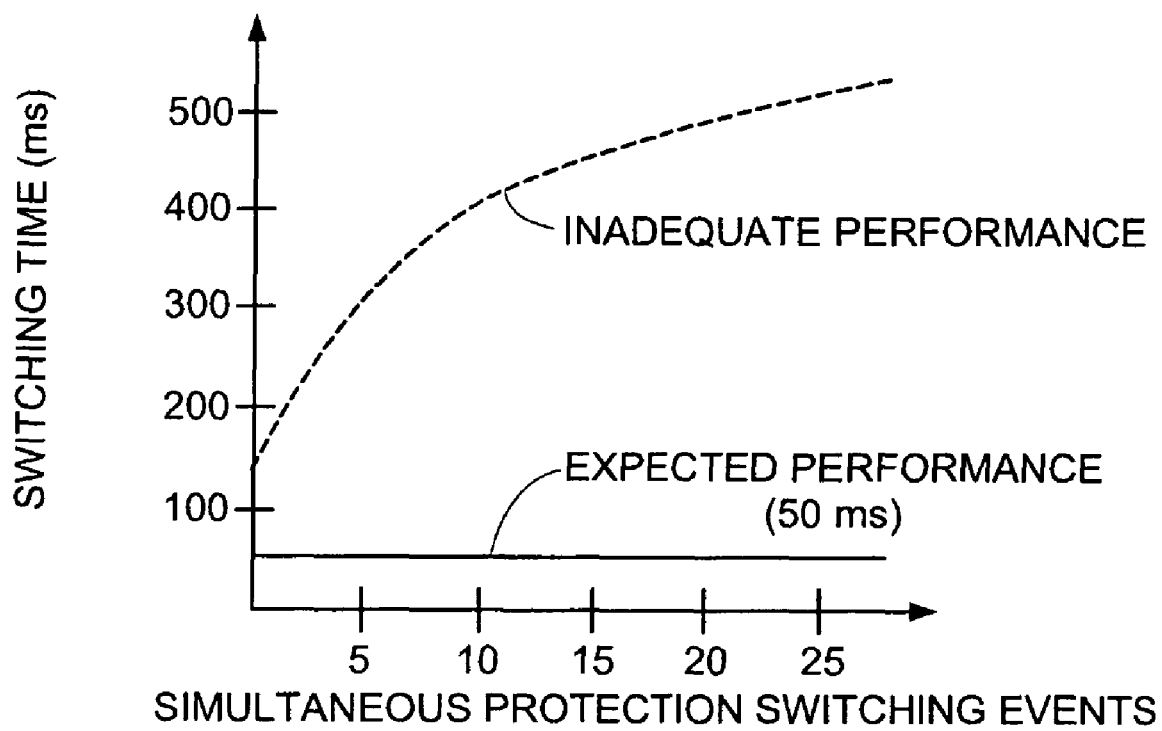
FIG. 1 is a plot of switching time (ms) versus simultaneous protection switching events for inadequate and ideal systems.

A 50 ms protection switching time requirement in a communication network is independent of network and network element size. Hence, as networks and network elements scale, both carriers and equipment providers must develop implementation strategies that allow this high level of resilience to be achieved. FIG. 1 illustrates the switching time performance of two network element architectures as a function of the number of simultaneous protection switching events. The solid line identifies performance of a network element that meets Synchronous Optical Network (SONET) requirements of 50 ms switch times across all protected interfaces and some networks, regardless of the number of simultaneous protection switching events. The dashed line illustrates inadequate performance of a second architecture in which the switching time increases with the number of simultaneous protection switching events. This non-deterministic behavior can lead to the possibility of higher layer protocols and data services initiating protection events.

Multiple simultaneous protection switching events are not a statistical improbability. They can be triggered by a single event. Consider a stacked ring application, where ten rings terminate on a single network element. The working interface of each ring enters a central office via a shared fiber conduit, and the protect interface enters the office through a separate shared conduit. A single "back-hoe fade" on either conduit leads to a protection switch on all ten rings. The expected performance of the network element is that a protection switch is performed on all ten rings and traffic is restored within 50 ms. However, as seen in the graph of FIG. 1, the second architecture requires over 400 ms before the traffic recovers, an eight-fold increase over the requirement. Clearly, network elements should be designed to meet the 50 ms switch time requirement regardless of the number of simultaneous protection switching events.

Figure 2A:
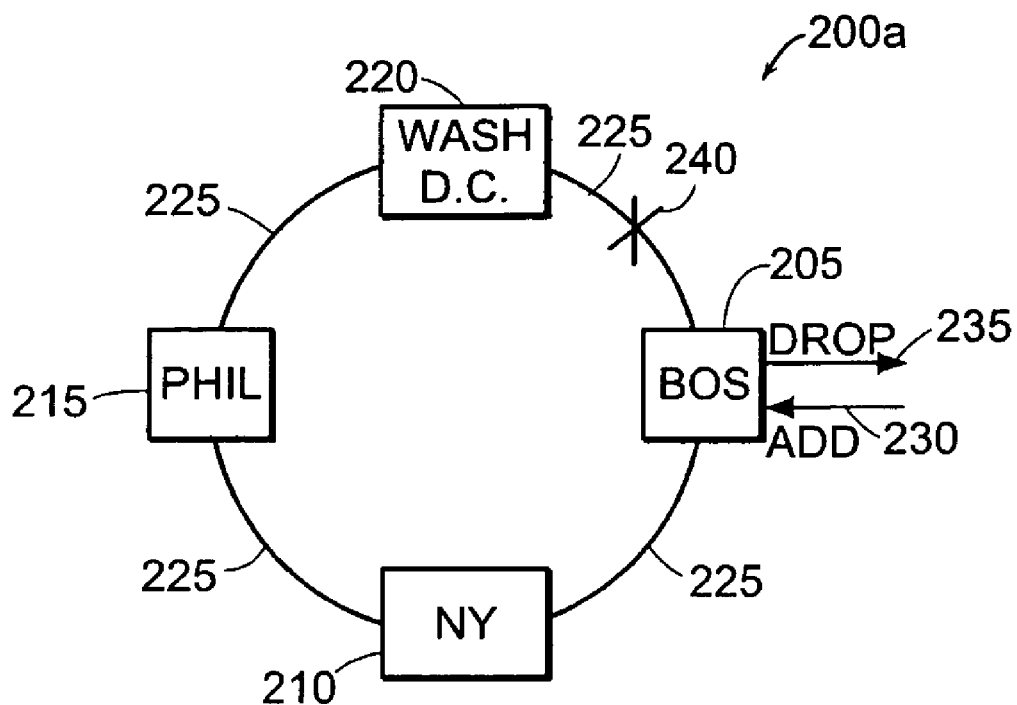
FIG. 2A is a ring network configuration having an expected protection switching performance as shown in FIG. 1.

FIG. 2A is a network diagram of a ring network 200a. To achieve expected performance levels, network elements 205, 210, 215 and 220, for example located in Boston, N.Y., Philadelphia, and Washington, D.C., respectively, are designed to meet the 50 ms switch time requirement for protection switching regardless of the number of simultaneous protection switching events. The network nodes 205, 210, 215, 220 may use electrical communications protocols or optical communications protocols to transport data across communications links 225.

The network node 205 includes an add/drop multiplexer (not shown) connected to an add link 230 and a drop link 235, respectively, to add and drop communications from other nodes, rings, or networks.

The network ring 200a may include a "break" 240, caused by any number of sources that disrupt communications through some or an entire set of cables or optical fibers. The break 240 results in failure of the associated link 225 between the Boston node 205 and Washington, D.C. node 220. Based on the 50 ms protection switching time requirement, all network nodes 205, 210, 215, and 220 must perform facility protection switching within the 50 ms requirement, which includes switching traffic to an alternative route (i.e., avoiding the break 240) around the ring network 200a.

Figure 2B:
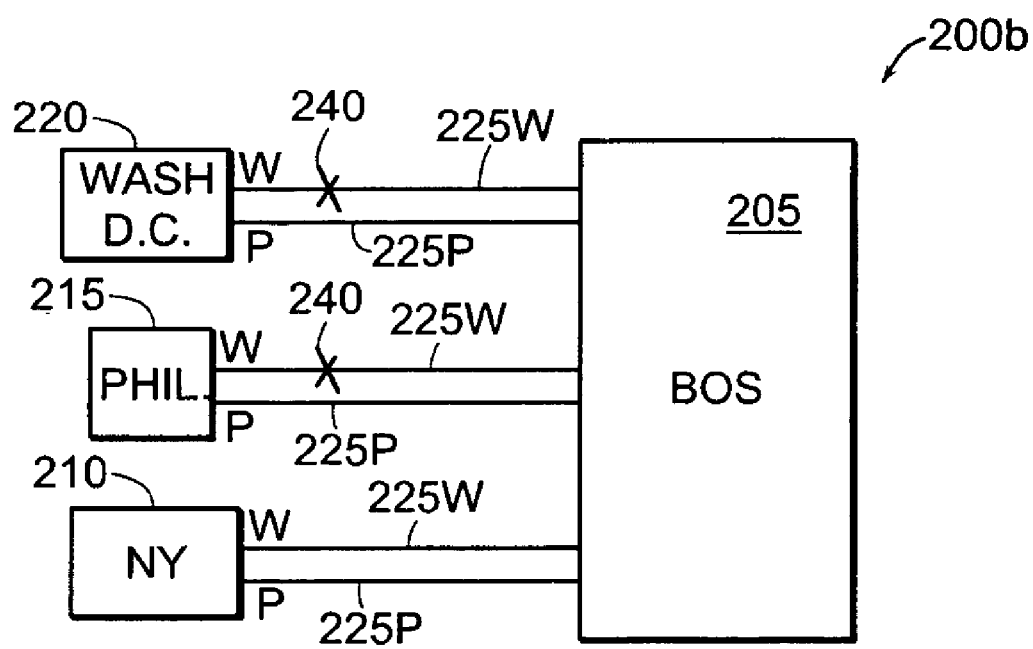
FIG. 2B is a point-to-point network configuration also having an expected protection switching performance as shown in FIG. 1.

Similarly, the point-to-point network 200b in FIG. 2B (versus the ring network of FIG. 2A) includes two breaks 240 affecting the communications links between the Boston node 205 and Washington, D.C. and Philadelphia nodes 220 and 215, respectively. In this example, the links 225 between the Boston node 205 and each of the other nodes 210, 215, and 220 includes a working path 225w and protection path 225p. Following the break 240 in the working path 225w, each of the nodes 205, 215 and 220 performs a facility protection switch within 50 ms to use the protection paths 225p.

Figure 3:
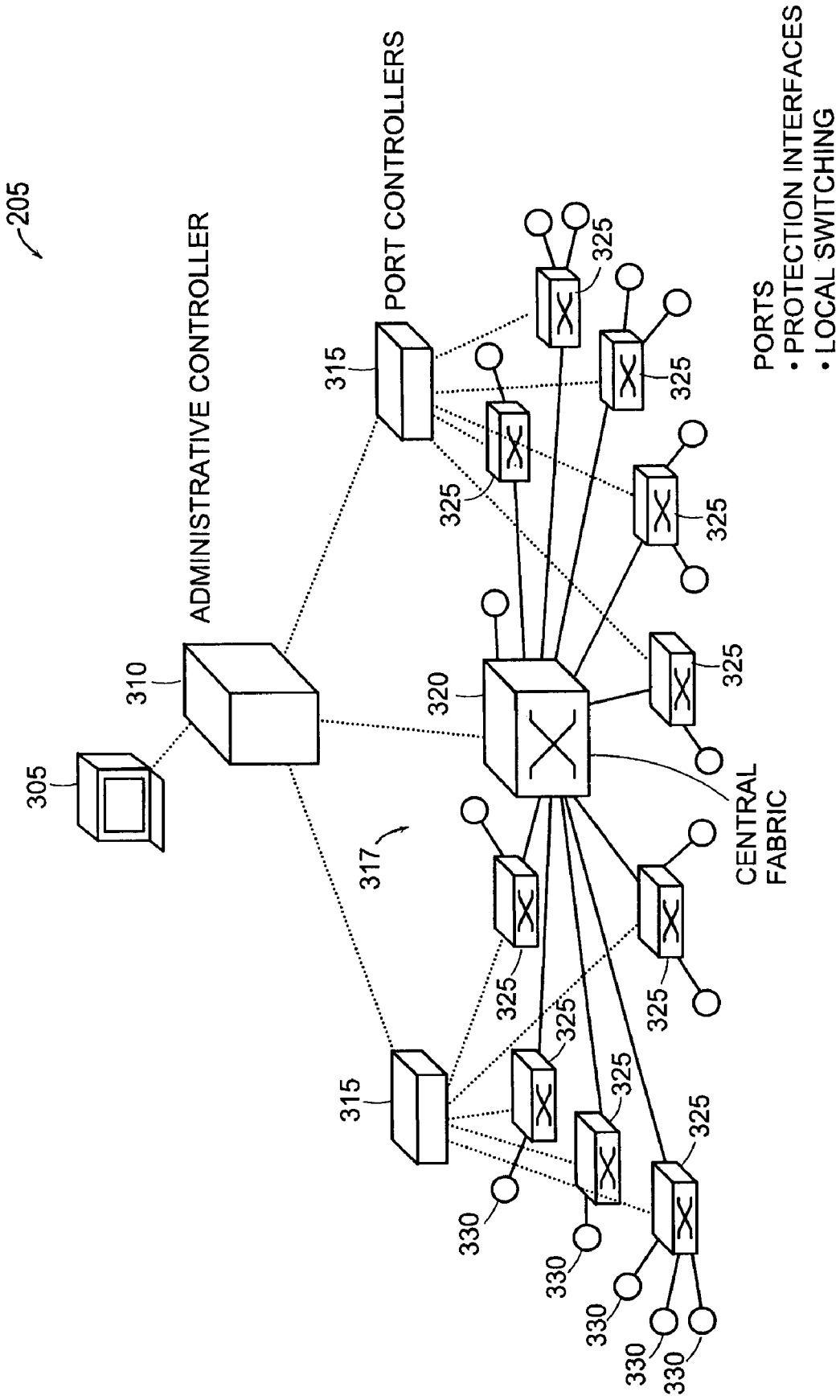
FIG. 3 is a three dimensional block diagram of a system having a distributed protection switching architecture according to the principles of the present invention to achieve the expected switching protection performance as shown in FIG. 1.

FIG. 3 is an example configuration of the Boston node 205 employing the principles of the present invention to achieve 50 ms protection switching independent of the network in which it is deployed. The node 205 configuration includes a user interface 305 connected to an administrative controller 310. The administrative controller 310 is connected to port controllers 315 and a central switch fabric 320. The port controllers 315 are connected to protection switch fabrics 325. The protection switch fabrics 325 are connected to at least one edge node 330, which may be single nodes or a network, including ring networks. The central switch fabric 320 and multiple protection switch fabrics 325 may be collectively referred to as a distributed switch fabric 317.

The central switch fabric 320 is "insulated" by the protection switch fabrics 325 from network ports (not shown) that interface with the edge nodes 330. Errors affecting data traffic communications are thus handled or "protection switched" by the protection switch fabrics 325. Such error handling is referred to as facility protection switching, or just protection switching unless otherwise specified. Using this technique, the central switch fabric 320 is left free to perform non-facility protection switching, such as providing a static connection to switch a subset of signals among multiple protection switch fabrics 325.

The protection switch fabrics 325 are located in or connected to ports or, interchangeably, protection groups (not shown), which may include protection interfaces and provide "local" switching, where local switching means switching traffic from one network interface to another network interface within a protection switch fabric 325 without using the central switch fabric 320.

The connections between the administrative controller 310 and port controllers may be physical or logical connections. For example, in one embodiment, there is a physical link that goes from the administrative controller 310 to the central switch fabric 320 and control information is distributed to the port controllers 315 using the same physical link used to transfer traffic from the central switch fabric 320 to the protection switch fabrics 325. In this embodiment, there is no out-of-band direct connection from the administrative controller 310 to the port controllers 315.

The distributed switch fabric 317 provides fast and deterministic 50 ms protection switching times by distributing smaller dedicated protection switch elements (i.e., the protection switch fabrics 325) among the ports. This eliminates any rearrangement of the central switch fabric 320 during protection switching events, allowing the protection switching time to be independent of the number of simultaneous protection switching events. The technique for performing protection switching in the ports can be as simple as toggling the control inputs (not shown) from "working" to "protect" for Linear Automatic Protection Switching (LAPS).

The distributed control architecture (i.e., administrative controller 310 and port controllers 315) maximizes the efficiency of the dedicated protection switch elements 325. In this configuration, the administrative processing functions are executed on the administrative controller 310, and facility interface processing functions are distributed to the multiple port controllers 315. The port controllers 315 allow the protection switching processing of one set of interfaces to be performed independent of the protection switching processing of other sets of interfaces. The distributed control function eliminates the global protection switching bottlenecks identified in centralized architectures of other configurations (not shown). The configuration of the node 205 can be scaled in terms of controllers 310, 315 and switch fabrics 320, 325 to the maximum traffic capacity while meeting the expected performance curve (solid line) in FIG. 1 for multiple simultaneous protection switching events.

Using this configuration, the network node 205 provides 50 ms protection switching performance whether terminating a few protected interfaces or thousands. With the continued importance of a carrier's network reliability, the scalability of the protection control and switching functions becomes a differentiating factor for selecting network nodes, including digital cross connects (DCC's) and optical cross connects (OXC's).

Each of the protection switch fabrics 325 and the central switch fabric 320 may include a redundant copy to provide redundancy for the protection switching and non-facility protection switching. This supports both facility protection switching and internal node protection switching so as to make the node 205 more resilient to failure.

The protection switch fabrics 325 may require less configuration than the central switch fabric 320. This arrangement allows the protection switch fabrics 325 to be reconfigured in a more rapid manner than the central switch fabric 320, which further supports the 50 ms protection switching requirement.

The distributed protection switch fabric 325 may also include less granularity than the central switch fabric 320. For example, the protection switch fabrics 325 may provide STS-1 level switching for OC-192 (10 Gbps), OC-48 (2.5 Gbps); OC-12 (622 Mbps), OC-3 (155 Mbps), and STS-1e (51.54 Mbps) SONET type interfaces. The central switch fabric 320 may provide switching for lower bandwidth protocols, including VT1.5 (which corresponds to DS1/T1 and operates at 1.544 Mbps) and DS0 (one voice channel) (64 kbps). Because the protection switch fabrics 325 can operate at the highest of today's communications protocols (i.e., OC-192 at 10 Gbps), the protection switch fabrics 325 can perform the facility-level switching and also perform local switching.

Each of the switch fabrics may support Time Division Multiplexing (TDM) switching, cell-based (i.e., fixed length) switching, and packet-type (variable length) switching.

In practice, a TDM switch may be implemented, for example, as a Time Slot Interchange (TSI) buffer, Clos network (i.e., multi-stage buffer), or cross-point switch (e.g., pipe-level or space switching). The choice to use one switch type over another is typically based on communications protocols, switch fabric size and complexity to support a given communications protocol, and so forth. In general, the more complex the implementation of the protection switch fabric 325, the more efficient the switches may need to be to achieve the 50 ms facility protection switching rate.

In the event that the protection switch fabrics 325 operate using a different switching protocol from the central switch fabric 320, a communications protocol converter (discussed later in reference to FIGS. 7A and 7B) may be employed. For example, the protection switch fabrics 325 may provide TDM switching, and the central switch fabric 320 may perform TDM switching, Asynchronous Transfer Mode (ATM) switching, or packet (Internet Protocol (IP) or Ethernet) switching. In such cases, the converter is inserted between the protection switch fabrics 325 and the central switch fabric 320 to provide conversion. In this way, the distributed switch fabric 317 can support switching for many network protocols without having to customize the switch fabrics 325, 320 for each network or develop new switch fabrics 325, 320 with the advent of a new communications protocol.

Switch interface modules (discussed later in reference to FIG. 10) may also be employed in the distributed switch fabric 317 between the protection switch fabric 325 and the central switch fabric 320. The switch interface modules allow for configuration connections between the distributed switch fabrics 325 and the central switch fabric 320, which can reduce the central switch fabric 320 complexity.

The facility protection switching supported by the protection switch fabrics 325 include Linear Automatic Protection Switching (LAPS), Unidirectional Path Switched Ring (UPSR) protection switching, Bidirectional Line Switched Ring (BLSR) protection switching (two-fiber and four-fiber types), and 1:n protection switching.

It should be understood that the flexibility provided by this distributed switching fabric 317 may support other network protocols and future network protocols.

It should also be understood that the switch fabrics 325 and 320 may be formed from multiple switch fabrics or a single switch fabric and be logically separated into the central switch fabric 320 and protection switched fabrics 325. The port controllers 315 and administrative controller 310 may be used to define and/or operate the switch fabrics 320 and 325 in a manner consistent with the physical implementation(s).

It should also be understood that methods for switching signals in a network are included in the teachings herein in reference to the distributed protection switching.

FIGS. 4-14 illustrate the embodiments just discussed. FIGS. 4-7B demonstrate system operation and elements discussed above beyond the switch fabrics 325, 320. FIGS. 8-14 describe uses and interconnections of the switch fabrics 325, 320 without and with the additional port elements in an increasing level of sophistication.

Figure 4:
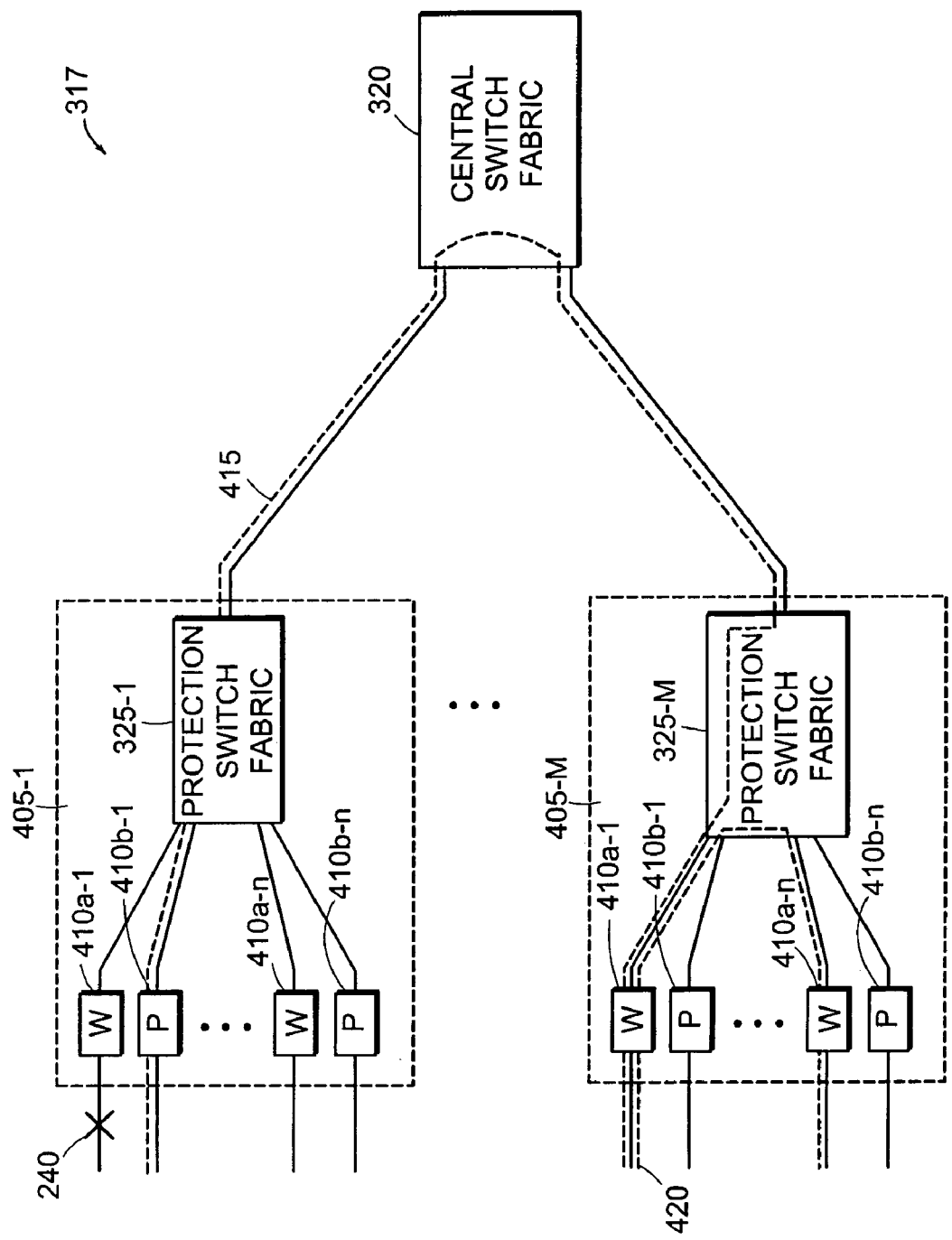
FIG. 4 is a schematic diagram of a subset of the system of FIG. 3 illustrating protection switching and local switching.

FIG. 4 is a schematic diagram of the distributed switch fabric 317 that is part of the configuration of FIG. 3. The central switch fabric 320 is connected to multiple ports 405-1, 405-2, . . . , 405-M) (collectively referred to as ports 405 or protection groups 405). Each of the protection groups 405 includes a protection switch fabric 325. Each of the protection switch fabrics 325 is connected to protected ports 410a and 410b. There may be multiple protected port pairs 410a-1/410b-1, 410a-2/410b-2, . . . , and 410a-n/410b-n. Each of these protected port pairs includes a working port (e.g., 410-a) and protect port (e.g., 410b). In the event of a line break 240 or other facility or non-facility failure, the protection switch fabric 325 identifies the failure 240 and switches from the working port 410a-1 to the protection port 410b-1. Detection of a failure may occur through identifying total loss of signal, increase of Bit Error Rate (BER) beyond a predetermined threshold, or monitoring of another metric. The central switch fabric 320 requires no reconfiguration in order to perform the protection switch.

Following protection switching, a complete communications path 415 extends (i) from the protection port 410b-1 through the protection switch fabric 325-1 and the central switch fabric 320 and (ii) to the protection switch fabric 325-M through its respective working port 410a-1. This path 415 is possible in the presence of the line break 240 as a result of the switch by the protection switch fabric 325-1. And, as discussed above, the distributed switch fabric 317 adheres to the 50 ms facility protection switch time requirement.

The protection switch fabric 325 isolates the central switch fabric 320 from changes in connections due to facility failures. The protection switch fabric 325-1 shows the switching function provided for Linear Automatic Protection Switching, with the selected traffic dropped to the central switch fabric 320.

Also shown in FIG. 4 is a local switch path 420 in which the protection switch fabric 325-M is used to perform local switching. The local switching occurs through the working port 410a-1 in the associated protection group 405-M, passes through the associated protection switch fabric 325-M, and continues through another working port 410a-n. The protection switch fabric 325-M performs local switching, which off-loads switching requirements from the central switch fabric 320. This off-loading may result in a reduction of the size and complexity of the central switch fabric 320.

Ring protection is a special case of local switching, allowing traffic from the working port 410a-1 or the protect port 410b-1 to be selected by the protection switch fabric 325-M. This selected traffic can be dropped to the central switch fabric 320 and/or continued to the associated working port 410a-n or protect port 410b-n via the protection switch fabric 325-M. This allows support for UPSR, 2-fiber BLSR, and 4-fiber BLSR ring protection schemes.

Figure 5:
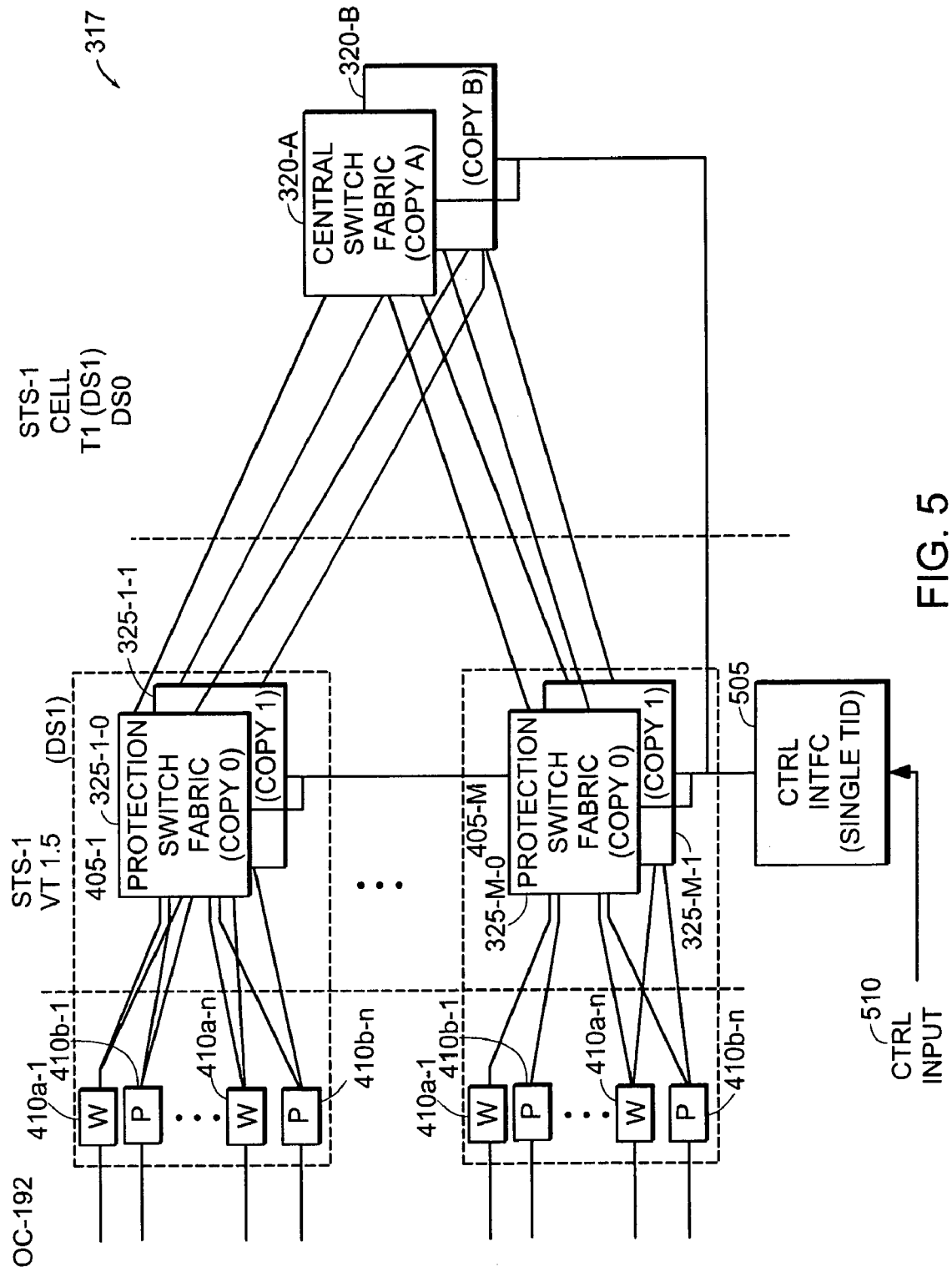
FIG. 5 is the schematic diagram of FIG. 4 including redundant switch fabrics and a single control interface.

FIG. 5 is a schematic diagram of the distributed switch fabric 317 that includes redundant central switch fabrics 320, referred to as copies A and B, and redundant protection switch fabrics 325, referred to as copies 0 and 1. In this embodiment, each of the protection ports 410a and 410b are connected to the protection switch fabrics 325-1-0, 325-1-1, ..., 325-M-0, and 325-M-1, respectively. Also, in this embodiment, each of the protection switch fabrics 325 are connected to each copy of the central switch fabrics 320-A and 320-B. Other connection implementations are discussed later in reference to FIGS. 8-14.

Continuing to refer to FIG. 5, the protection groups 410 may operate at OC-192 rates, and the protection switch fabrics 325 may operate at STS-1 and VT1.5 (DS1) rates and provide corresponding switching granularities. The central switch fabrics 320 may operate at even lower communications bandwidths and increased granularity, including STS-1, cell, T1 (DS1) and DS0.

Since the protection switch fabrics 325 operate at granularities less than or equal to the granularity of the central switch fabrics 320, the configurations for the protection switch fabrics 325 are less than that of the central switch fabrics 320. This means that the protection switch fabrics 325 have a reconfiguration (i.e., protection switching) speed advantage over the central switch fabrics 320. The speed advantage can be advantageously used to achieve the 50 ms facility protection switching rates for the network nodes 205, 210, 215, and 220 independent of the central switch fabric 320.

A control interface 505 may be used to control each of the protection switch fabrics 325 and central switch fabrics 320. In this embodiment, the control interface 505 is arranged differently from the administrative controller 310 (FIG. 3) in that it is connected directly, either by physical or logical links, to each of the protection switch fabrics 325. Whether in this configuration or the configuration of FIG. 3, a control input 510 may (i) include a task identifier (TID), which is similar to a domain name, and (ii) control configurations of each of the switch fabrics 325 and 320 through this single point of control. This is useful in that configuration of the distributed switch fabric 317 is simplified and can reduce configuration times for the distributed switch fabric 317.

Figure 6:
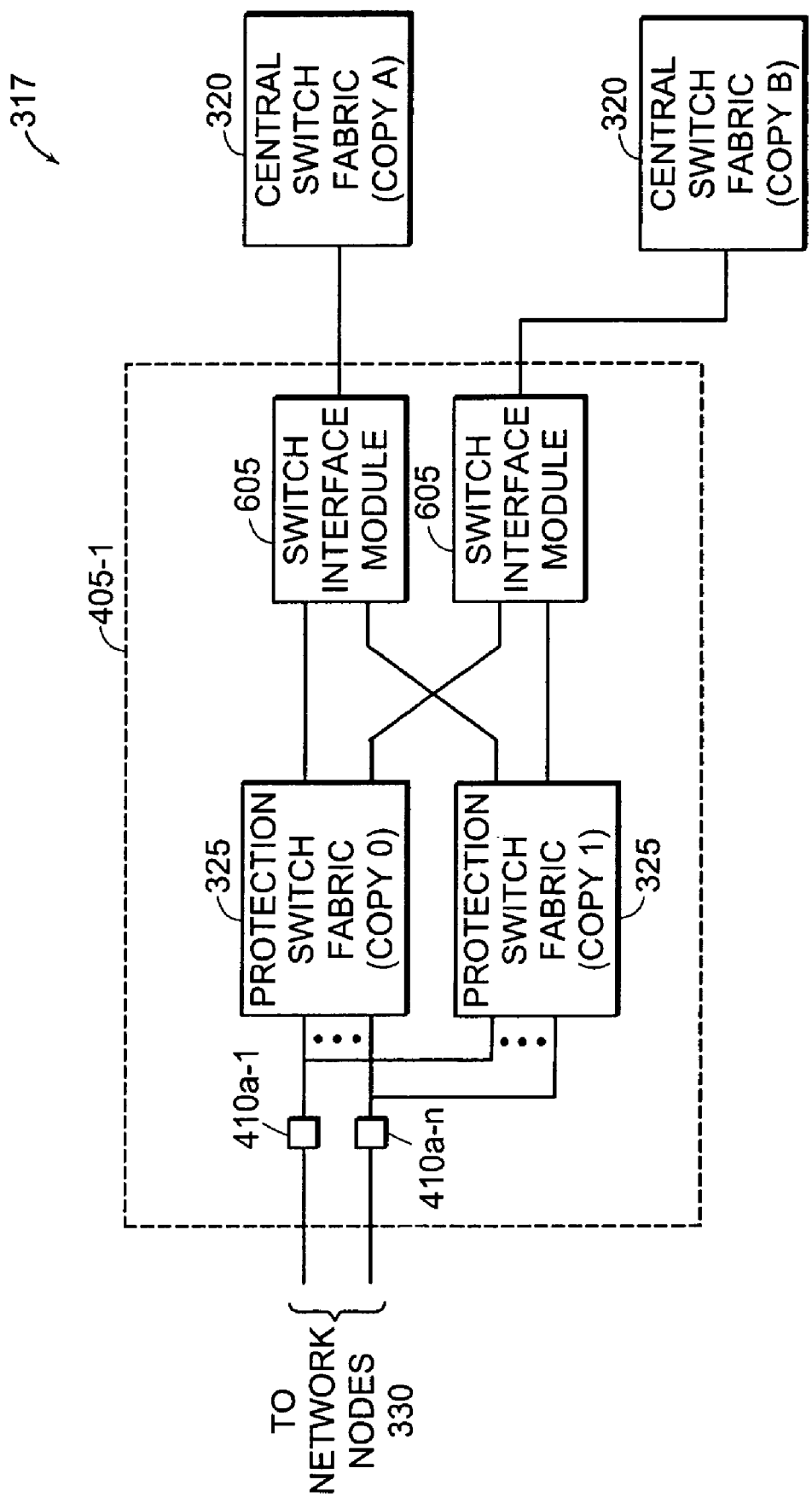
FIG. 6 is a schematic diagram of the system of FIG. 4 that includes a switch interface module between protection switch fabrics and a central switch fabric.

FIG. 6 is a schematic diagram of the distributed switch fabric 317 that includes a switch interface module 605 between the protection switch fabrics 325 and copies A and B of the central switch fabrics 320. The switch interface module 605 may be located in the protection groups 405 or be external from the protection groups 405.

The configuration shown in FIG. 6 allows traffic to flow through the system for the case where both a single central switch fabric copy has failed and, simultaneously, a single protection switch fabric copy has failed. The switch interface module 605 performs a protection switch between the signals from the two protection switch fabric copies. Because of this, only half the number of links need to be sent from the protection group to a central switch fabric copy. This allows a smaller capacity switch to be used as the central switch fabric 320.

In addition, use of the switch interface modules 605 allows for other configurations between the protection switch fabrics 325 and the central switch fabrics 320. Thus, the switch interface module 605 allows for the use of a smaller capacity central switch fabric 320 since a reduction in resources of the central switch fabrics 320 can also be achieved due to the configuration options facilitated by the switch interface module 605.

Figure 7A:
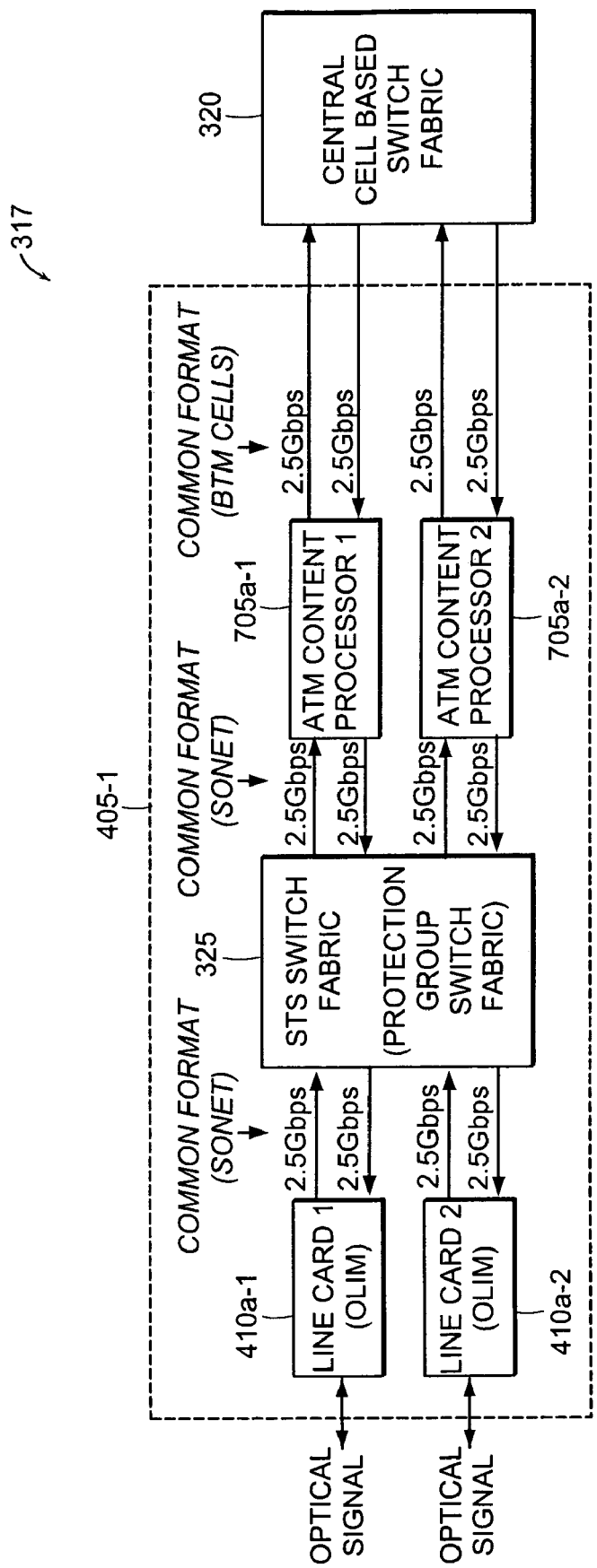
FIG. 7A is a schematic diagram of the system of FIG. 4 including content processors between the protection switch fabrics and central switch fabric.
Figure 7B:
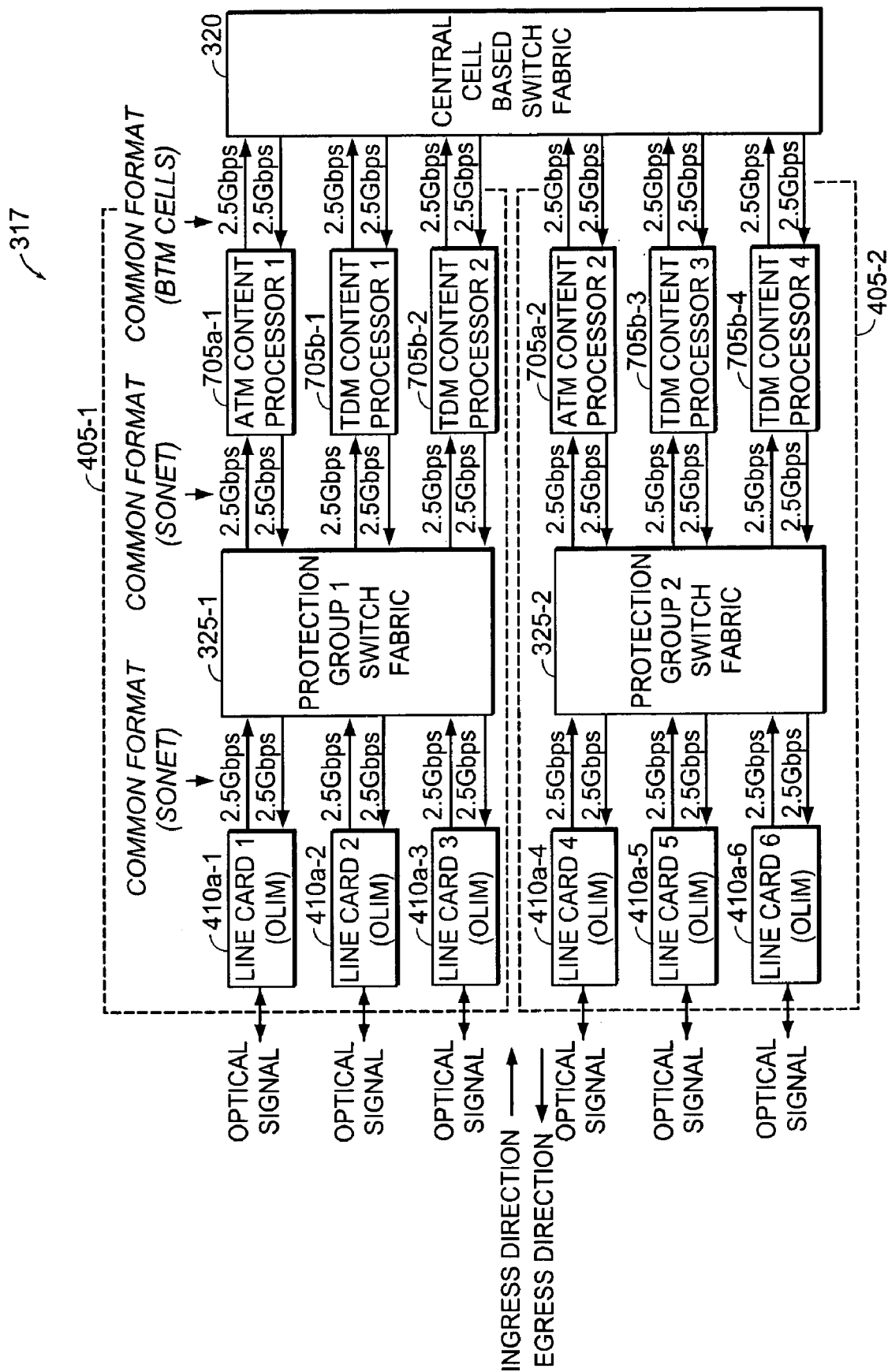
FIG. 7B is a schematic diagram illustrating another embodiment of the system of FIG. 7A.

FIGS. 7A and 7B are schematic diagrams of embodiments of the distributed switch fabric 317 in which "content processing" is separated from "content switching."

In FIG. 7A, it is assumed that each of the line cards 410a transport a bi-directional STS-48c ATM payload. The port 405-1 includes a first ATM content processor 705a-1 and a second ATM content processor 705a-2. Although each ATM content processor 705a may also be capable of switching ATM cells, it is not necessary for them to perform this switching function since the central switch fabric 320, which is cell-based in this embodiment, performs this function. When an ATM content processor 705 is forwarded an STS-48c payload from the protection switch fabric 325, which is an STS switch fabric in this embodiment, the content processor 705 extracts the individual ATM cells from the SONET payload, places each ATM cell into a system cell that is understood by the central (cell-based) switch fabric 320, attaches a "routing tag" to each system cell, and forwards all cells to the central (cell-based) switched fabric 320. The central switch fabric 320 then forwards (i) all system cells destined for a first port interface 410a-1, which may be an Optical Line Interface Module (OLIM), to the first ATM content processor 705a-1 and (ii) all cells destined for the second line card 410a-2 to the second ATM content processor 705a-2. The first ATM content processor 705a-1 then forms a new STS-48c payload with the ATM cells it receives from the central switch fabric 320 and forwards the STS-48c to the protection switch fabric 325. The protection switch fabric 325 then switches all 48 STS-1 segments of this STS-48c back to the first line card 410a-1. Similarly, the second ATM content processor 705a-2 forms a new STS-48c signal from the cells it receives from the central switch fabric 320 and forwards the signal to the second line card 410a-2 via the protection switch fabric 325. Since the central switch fabric 320 switches all the incoming cells, if cells destined for both line cards arrive on the optical signal at the first line card 410a-1, all cells may be forwarded to both line cards.

The distributed switch fabric 317 of FIG. 7B uses two protection switch fabrics 325 but could just as easily use a single protection switch fabric 325. Each of six line cards 410a-1 through 410a-8 has its ATM oriented STS-12c connected to the ATM content processor 705a within its corresponding protection group 405-1 or 405-2. Both ATM content processors 705a-1 and -2 then forward all cells to the central switch fabric 320. The central switch fabric 320 forwards all cells to the appropriate ATM content processor 705a in the egress direction (i.e., away from the central switch fabric 320).

For example, the cells of all ATM connections to the first three line cards 410a-1/2/3 from all six line cards are forwarded in the egress direction to the first ATM content processor 705a-1 by the central switch fabric 320. The first ATM content processor 705a-1 combines all the cells destined for the first line card 410a-1 into one STS-12c signal, all the cells destined for the second line card 410a-2 into a second STS-12c signal, and all cells destined for the third line card 410a-3 into a third STS-12c signal. The protection switch 325-1 forwards the three STS-12c signals to the appropriate line card. Similarly, the cells of all ATM connections to the fourth through sixth line cards from all six line cards are forwarded in the egress direction to the second ATM content processor 705a-2 by the central switch fabric 320. For the system, all ATM cells of all connections can be correctly forwarded.

A similar process takes place for TDM cells that are serviced by the TDM content processor 705b-1/2/3/4. Another example of a content processor that may be employed is a packet (IP or Ethernet) content processor (not shown). Other configurations and content processors that perform content processing separate from content switching may be employed in other embodiments.

FIGS. 8-14 are schematic diagrams of various configurations of the distributed switch fabric 317 discussed above. Each of the facility interfaces receives one OC-192 link connected to the physical layer processors 410a (i.e., line cards 410a or ports 410a). Protection links 810 that each carry 10 Gbps of data are located between the physical layer processors 410a and the protection switched fabrics 325 copies 0 and 1. In addition, each of multiple central fabric links 815 transports data from the ports 405 to the associated central switch fabrics 320.

Interconnections between the protection switched fabrics 325 and central switch fabrics 320 include a configurable number of lines. For example, referring to FIG. 8, there are eight lines (i.e., p=8) with each line transporting 5 Gbps. The total data rate is equivalent to 40 Gbps. In this arrangement, one set of lines composing a central fabric link 815 between the protection switch fabrics 325 and central switch fabric 320 supports the necessary bandwidth for four OC-192's (i.e., half of the facility bandwidth is forwarded to the central switch fabric 320 after the protection selection). Further, the eight lines are divisible into smaller numbers, which allows for several arrangements of the lines (i.e., the number of lines in a given central fabric link 815 between the protection switch fabrics 325 and the central switch fabric 320 is configurable). For example, local switching can be provided by the protection switch fabrics 325, so there may be fewer lines (e.g., four 5 Gbps lines, instead of eight) from the protection switch fabrics 325 to the central switch fabric 320, which results in a larger system with the same size central switch fabric 320.

Figure 8:
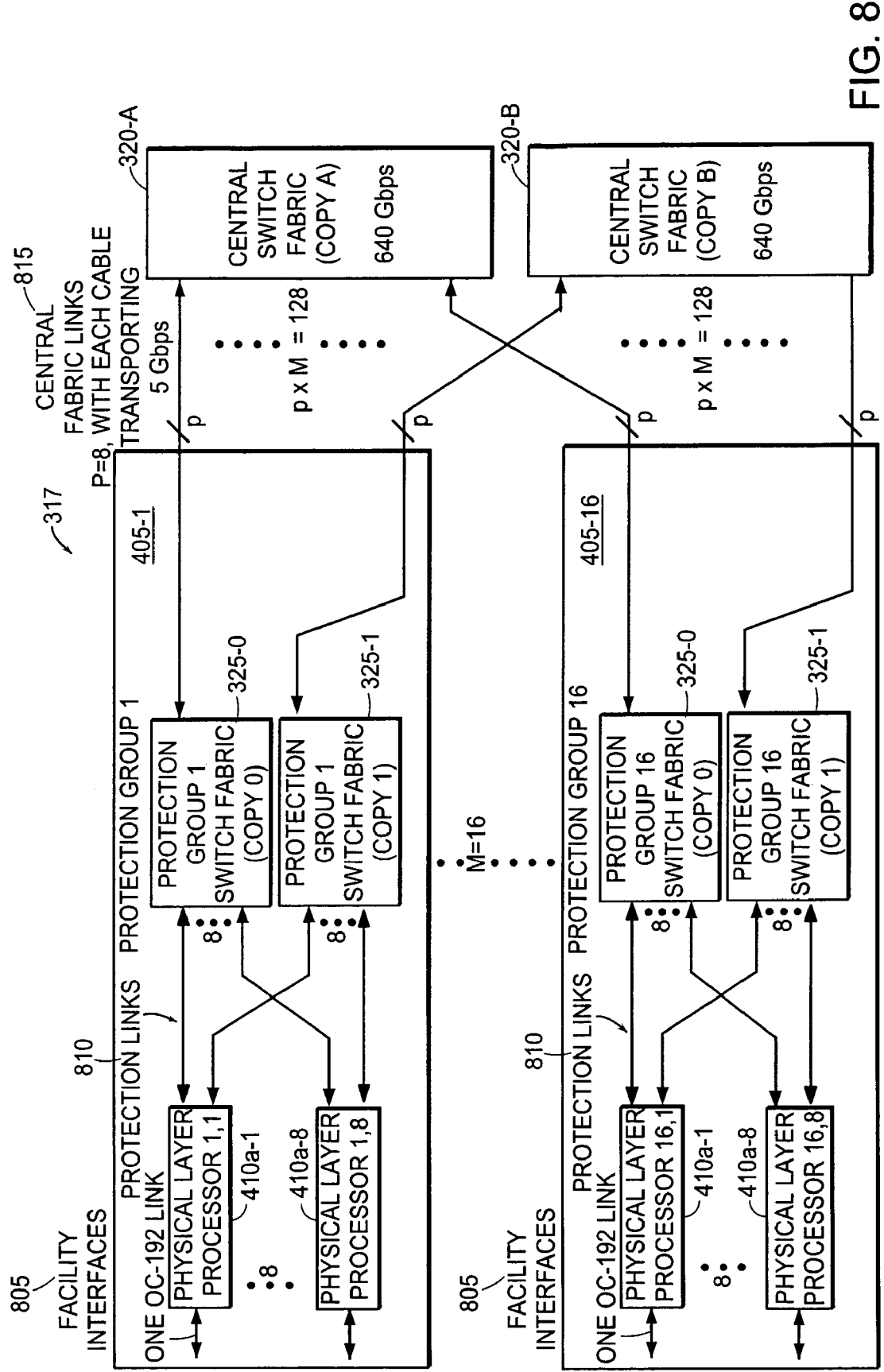

Continuing to refer to FIG. 8, in the first protection group 405, one protection switch fabric 325-0 is connected to the copy A central switch fabric 320-A and not the copy B central switch fabric 320-B. Similarly, the other protection switch fabric 325-1 in the same protection group 405 is connected to the copy B central switch fabric 320-B and not the copy A central switch fabric 320-A. The result of this configuration is p×M=128, where p is the number of lines in each central fabric link 815 and M is the number of protection groups 405. Since each line carries 5 Gbps, each central switch fabric 320 operates at 640 Gbps.

Figure 9:
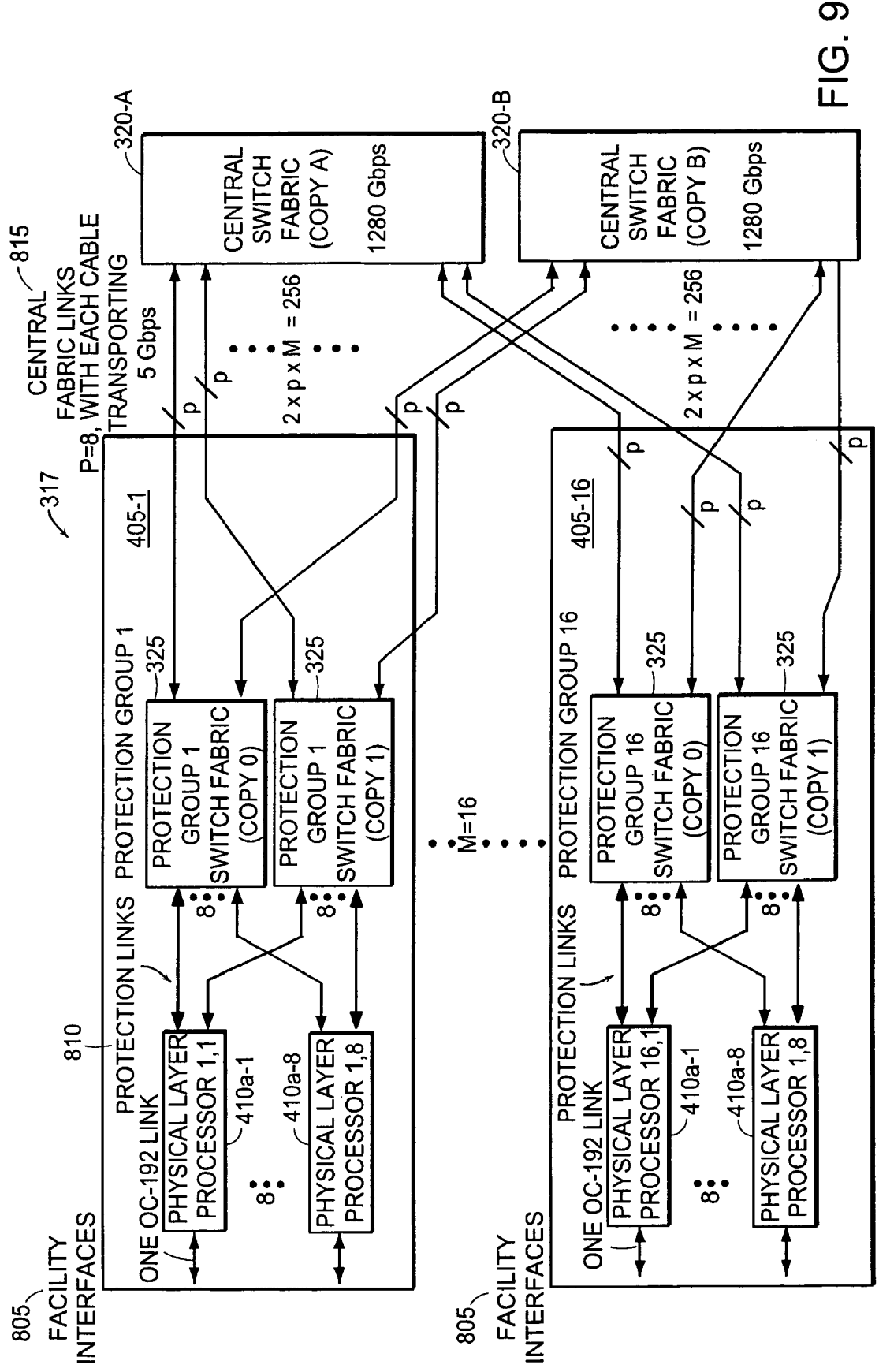

FIG. 9 illustrates another embodiment in which each protection switch fabric 325 is directly connected to both the copy A central switch fabric 320-A and copy B central switch fabric 320-B. In this instance, because the number of central fabric links 815 connecting to each copy of the central switch fabric 320 includes one link from each protection switch fabric 325, each copy of the central switch fabric 320 operates at 1280 Gpbs, which is double the rate of the embodiment in FIG. 8.

Figure 10:
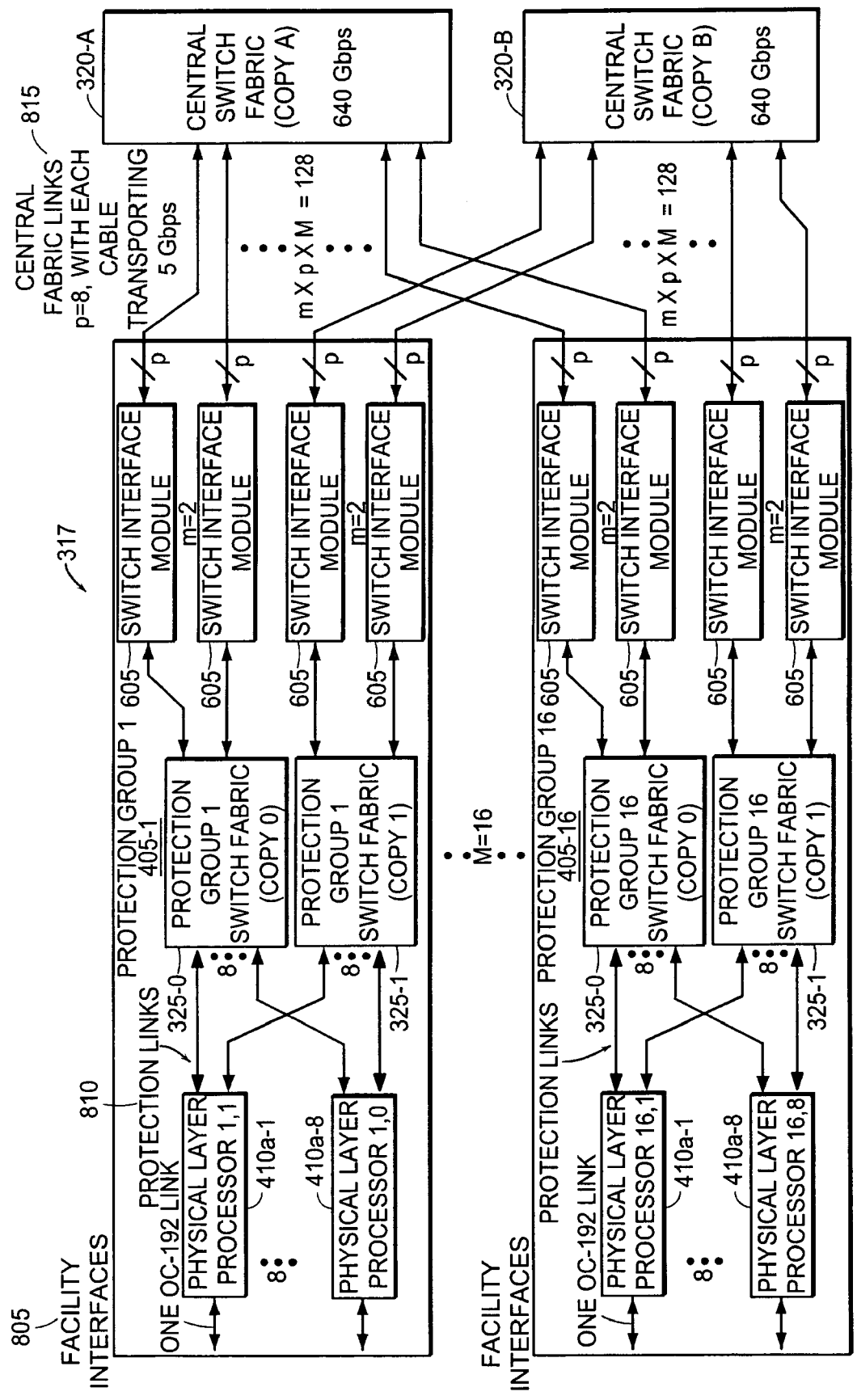

FIG. 10 is a schematic diagram of the distributed switch fabric 317 in which one protection switch fabric 325 in a protection group 405 is (i) indirectly connected to the copy A central switch fabric 320-A via switch interface module 605 and (ii) not connected to the copy B central switch fabric 320-B. The other protection switch fabric 325-1 in the same protection group 405 is (i) indirectly connected to the copy B central switch fabric 320-B via switch interface module 605 and (ii) not connected to the copy A central switch fabric 320-A. In this example, there are four lines in each central fabric link 815 extending from each switch interface module 605. In combination with the number of switch interface modules 605 to which each protection switch fabric 325 is connected and the total number of protection groups 405, each central switch fabric 320 operates at 640 Gbps (i.e., 2×4×16×5 Gbps). It should be noted that the switch interface modules 605 provide a cost effective method for depopulating the lines within the central fabric links 815 compared to connecting the protection switch fabrics 325 directly to the central switch fabrics 320 as in FIG. 8, since each switch interface module 405 need only be populated with four interfaces compared to having to populate all protection switch fabrics 605 with the maximum number, in this case eight, and using fewer.

Figure 11:
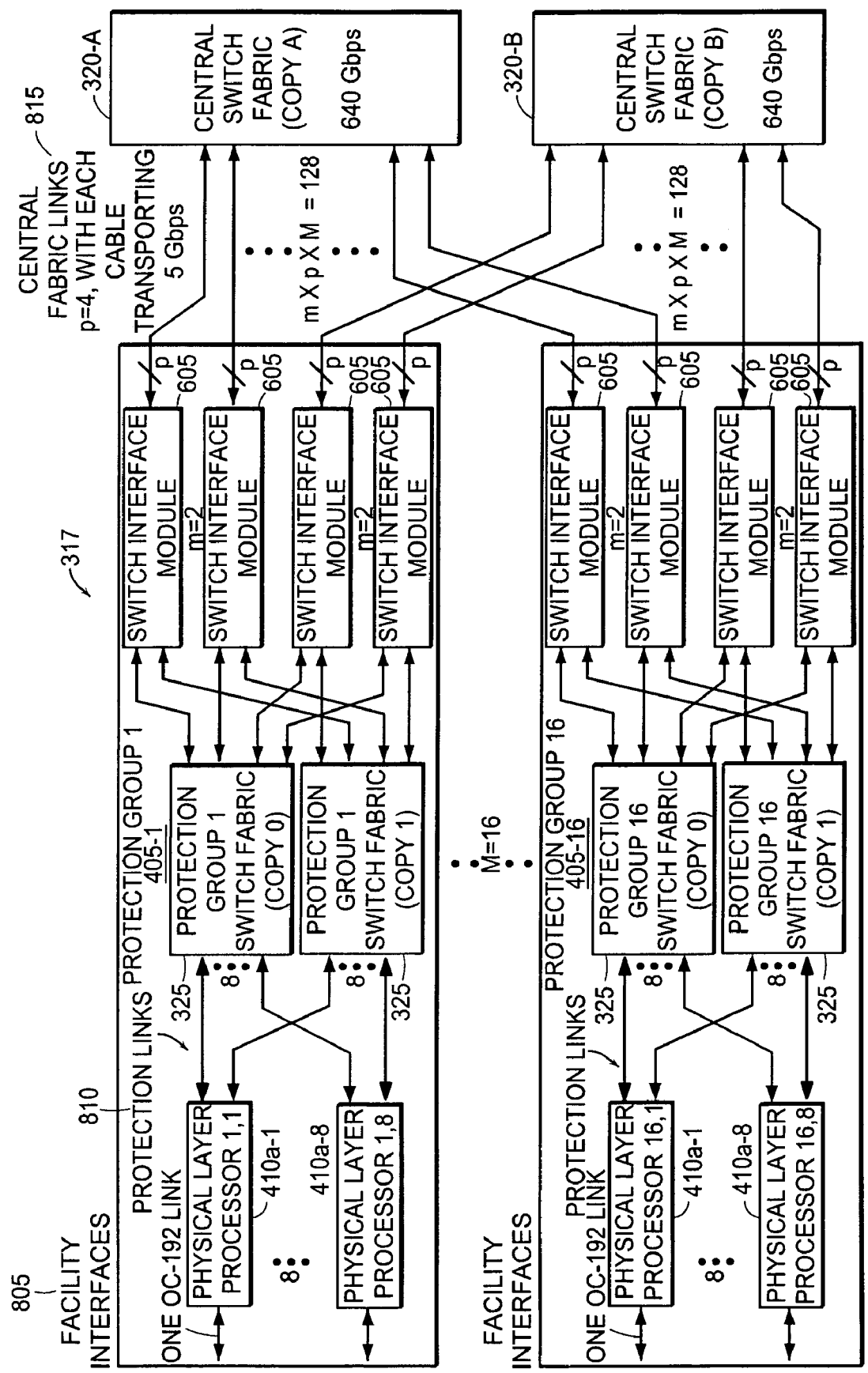

FIG. 11 illustrates an embodiment in which each protection switch fabric 325 is indirectly connected to both the copy A central switch fabric 320-A and copy B central switch fabric 320-B via switch interface module 605. In this arrangement, the central switch fabrics 320-A and 320-B operate at 640 Gbps. It should be noted that the central fabric links 815 include four lines each transporting data at 5 Gbps rather than eight lines in each central fabric link 815 as a result of employing the switch interface modules 605.

Figure 12:
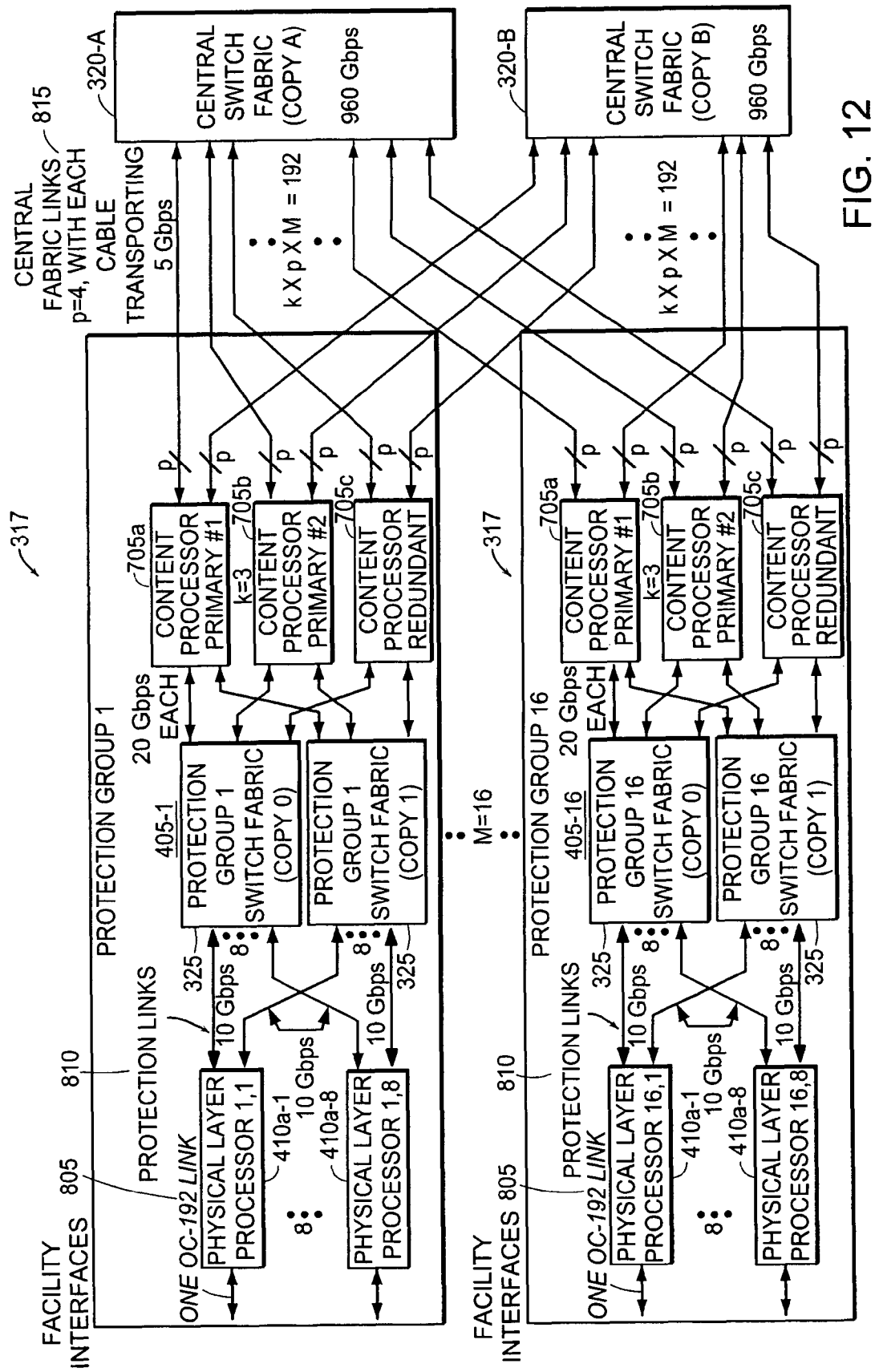

FIG. 12 is another embodiment of the distributed switch fabric 317 in which each protection switch fabric 325 is indirectly connected to both the copy A central switch fabric 320-A and copy B central switch fabric 320-B via content processor modules 705, which provide processing for converting communications protocols as discussed above in reference to FIGS. 7A and 7B. The content processor 705 may be deployed in a 1:n protection arrangement, where n may take on the value of 1 or more. In this arrangement, the capacity of the central switch fabrics 320 is equal to the number of content processors 705 multiplied by the number of lines associated with each central fabric link 815 multiplied by the number of protection groups 405, which equals 960 Gbps. Thus, the central switch fabrics 320 operate at 960 Gbps.

FIG. 13 is an embodiment in which each protection switch fabric 325 is indirectly connected to both the copy A central switch fabric 320-A and copy B central switch fabric 320-B via content processor module 705, and where a given content processor module 705 is connected either to the copy A central switch fabric 320-A or copy B central switch fabric 320-B, but not both. The resulting capacity of the central switch fabrics 320 is 640 Gbps (i.e., 2 content processors×4 lines in each central fabric link×16 protection groups×5 Gbps).

Figure 14A:
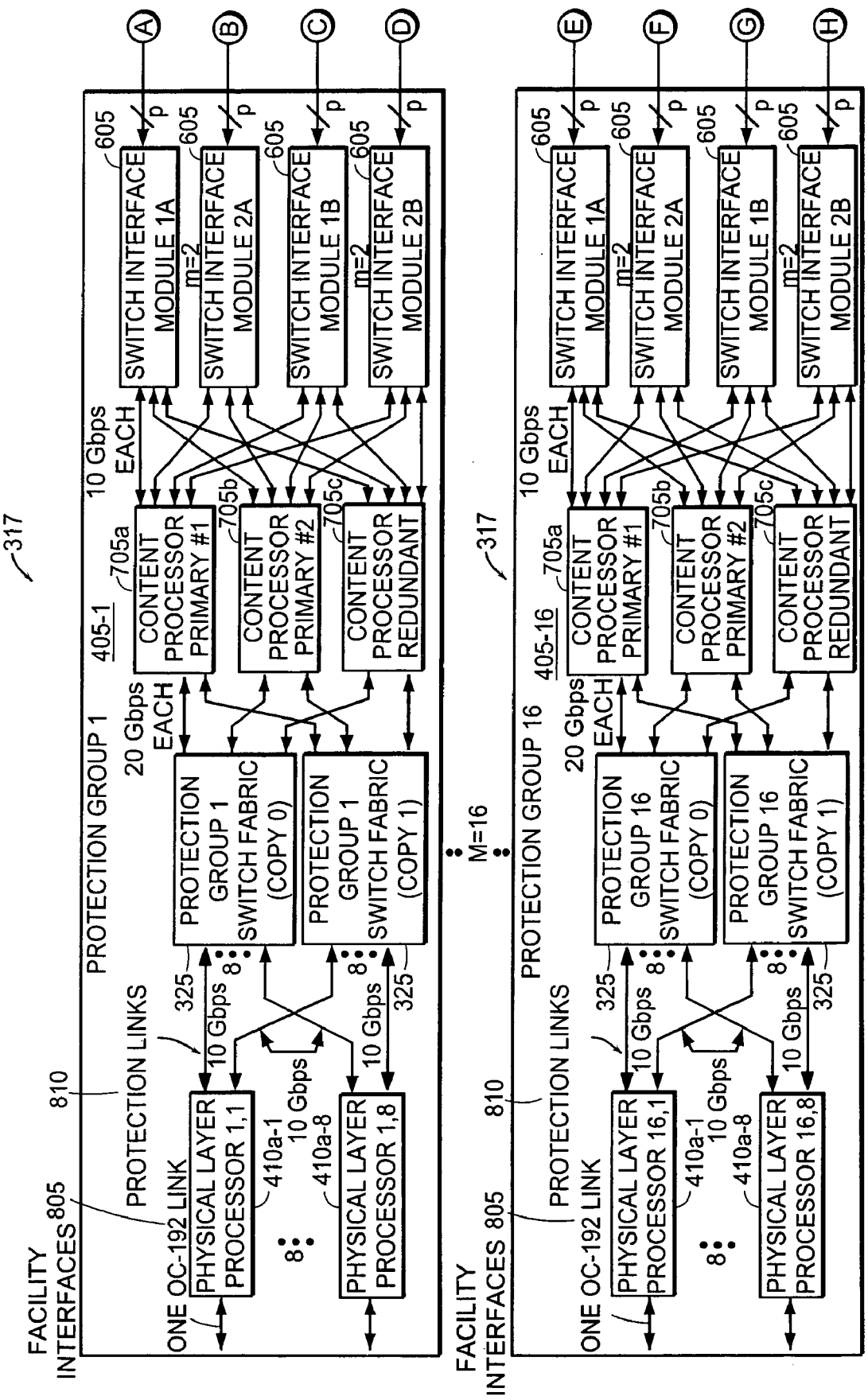
Figure 14B:
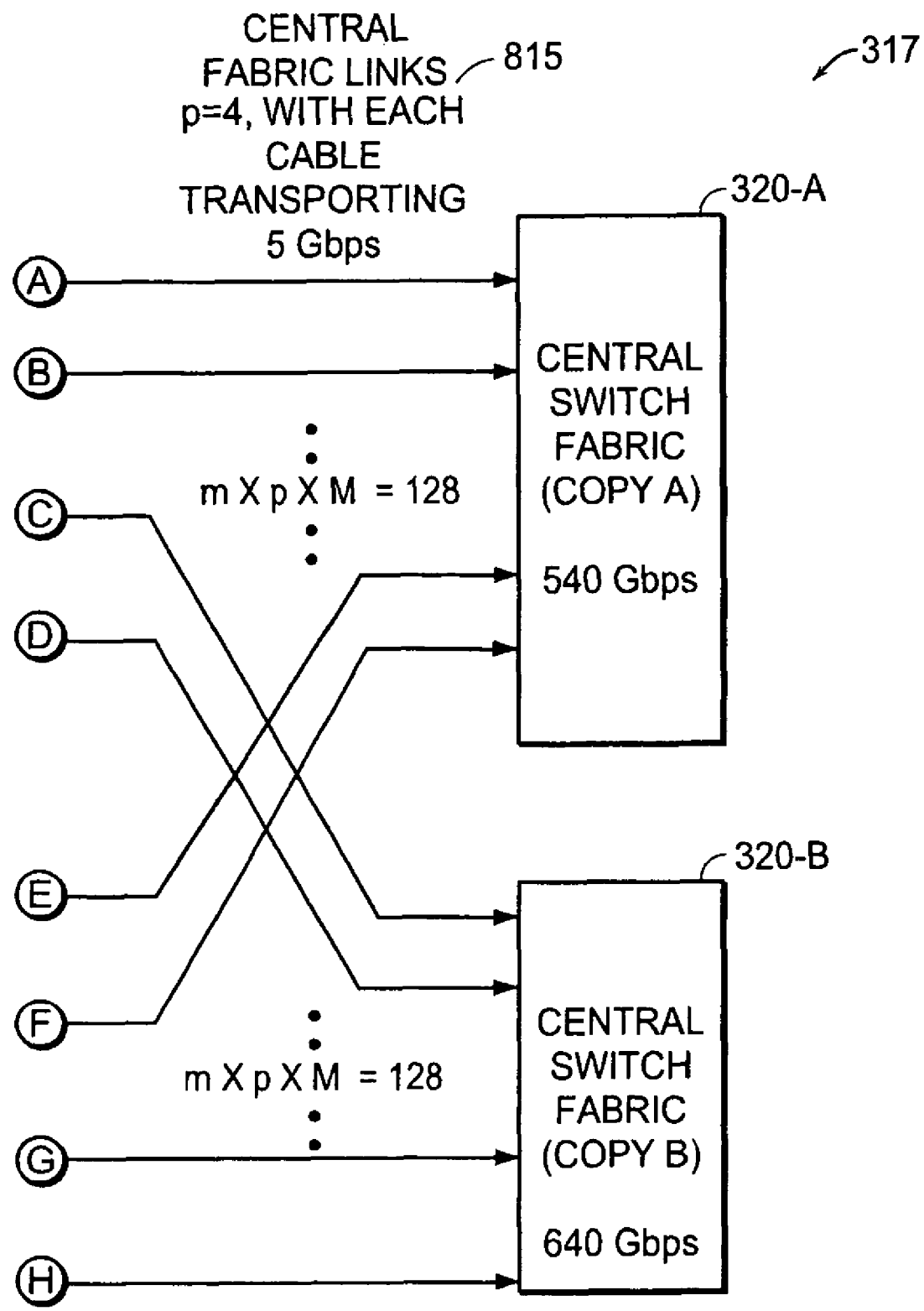

FIG. 14 is another embodiment of the distributed switch fabric 317. In this embodiment, each protection group 405 contains both content processors 705 and switch interface modules 605. Within each protection group 405, each content processor 705 connects to each switch interface module 605. Also, within each protection group 405, each protection switch fabric 325 connects to each content processor 705. Further, a given switch interface module 605 connects to either the copy A central switch fabric 320-A or the copy B central switch fabric 320-B, but not both. In this example, the central switch fabrics 320 operate at 640 Gbps. In another embodiment (not shown), each switch interface module 605 connects to both central switch fabrics 320, causing the central switch fabrics 320 to operate at 1280 Gbps but provides complete redundancy throughout the distributed switch fabric 317.

Referring to FIGS. 8-14 in general, the total aggregate facility bandwidth forwarded to each central switch fabric 320 may be less than or equal to one-half the total aggregate facility bandwidth that enters the combination of all physical layer processors 410. As discussed, the number of lines within the central fabric links 815 may be provided such that only enough lines are connected between a given protection group switch fabric 325 and a given central switch fabric 320 in order to support the amount of aggregate facility bandwidth that is forwarded to the central switch fabric 320 from the protection group switch fabric 325. This, again, facilitates the depopulation of links, which allows for a smaller and simpler central switch fabric 320.

It should be understood that the processing performed in conjunction with the modules discussed above (e.g., content processor 705 and switch interface modules 605) may be implemented in software, firmware or hardware, and, when implemented in software, may be executable instructions stored in memory, such as RAM, ROM, optical storage media, magnetic storage media, and so forth, loaded, and executed by a general purpose or application-specific processor in a manner consistent with the teachings herein.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for switching signals in a network, comprising:
    multiple first switch fabrics to perform facility protection switching at a subrate of the signals relative to a rate at which the signals are received by the multiple first switch fabrics; and
    a second switch fabric coupled to the first switch fabrics to switch a subset of the signals in a non-facility protection switching manner among the first switch fabrics.

2. The apparatus according to claim 1 wherein the first and second switch fabrics are coupled to a single point of control.

3. The apparatus according to claim 1 wherein the first switch fabrics include less configuration than the second switch fabric.

4. The apparatus according to claim 1 wherein the first switch fabrics include less granularity than the second switch fabric.

5. The apparatus according to claim 1 wherein the first switch fabrics also perform local switching.

6. The apparatus according to claim 1 further including redundant first or second switch fabrics.

7. The apparatus according to claim 1 wherein the first or second switch fabrics support Time Division Multiplexing (TDM) switching, fixed-length switching, or variable-length switching.

8. The apparatus according to claim 1 wherein the first switch fabrics perform facility protection switching within a predetermined time span in response to multiple simultaneous failures in the network.

9. The apparatus according to claim 1 wherein the coupling between the first and second switch fabrics is configurable.

10. The apparatus according to claim 1 further including a content processor coupled to and between the first and second switch fabric to convert the signals from a first protocol to a second protocol.

11. The apparatus according to claim 1 wherein the facility protection switching includes Linear Automatic Protection Switching (LAPS), Unidirectional Path Switched Ring (UPSR) protection switching, Bidirectional Line Switched Ring (BLSR) protection switching, and 1:n protection switching.

12. A method for switching signals in a network, comprising:
    performing facility protection switching at a subrate of the signals by multiple first switch fabrics relative to a rate at which the signals are received by the multiple first switch fabrics; and
    switching a subset of the signals in a non-facility protection switching manner among the multiple first switch fabrics by a second switch fabric.

13. The method according to claim 12 further including controlling the first and second switch fabrics via a single point of control.

14. The method according to claim 12 further including configuring the first switch fabrics less than the second switch fabric.

15. The method according to claim 12 further including processing the signals with the first switch fabrics with less granularity than the second switch fabric.

16. The method according to claim 12 further including performing local switching with the multiple first switch fabrics.

17. The method according to claim 12 further including supporting redundant facility protection switching and redundant non-facility protection switching.

18. The method according to claim 12 further including operating the first and second switch fabrics using Time Division Multiplexing (TDM) switching, fixed-length switching, or variable-length switching.

19. The method according to claim 12 wherein performing facility protection switching occurs within a predetermined time span in response to multiple simultaneous failures in the network.

20. The method according to claim 12 further including adjustably configuring coupling between the multiple first switch fabrics and the second switch fabric.

21. The method according to claim 12 further including converting the signals from a first communications protocol to a second communications protocol.

22. The method according to claim 12 wherein the facility protection switching includes Linear Automatic Protection Switching (LAPS), Unidirectional Path Switched Ring (UPSR) protection switching, Bidirectional Line Switched Ring (BLSR) protection switching, and 1:n protection switching.

23. An apparatus for switching signals in a network, comprising:
    first means for performing facility protection switching at a subrate of the signals relative to a rate at which the signals are received by the means; and
    second means for switching a subset of the signals among the first means in a non-facility protection switching manner.

* * * * *